United States Patent
Berry et al.

(10) Patent No.: US 8,205,216 B2
(45) Date of Patent: Jun. 19, 2012

(54) DATA SHARING BETWEEN APPLICATIONS WHERE ONLY ONE APPLICATION KNOWS THE BUSINESS PURPOSE OF THE DATA

(75) Inventors: Charles Franklin Berry, Apalachin, NY (US); Glenn C. Godoy, Endwell, NY (US); Amy Jeanne Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 12/113,468

(22) Filed: May 1, 2008

(65) Prior Publication Data

US 2009/0276792 A1    Nov. 5, 2009

(51) Int. Cl.
G06F 15/163    (2006.01)

(52) U.S. Cl. ........ 719/318; 719/313; 719/330; 707/703; 706/47

(58) Field of Classification Search ............... 705/26.1; 707/703; 719/318, 313, 330; 706/47
See application file for complete search history.

(56) References Cited

U.S. PATENT DOCUMENTS

| | | | |
|---|---|---|---|
| 5,187,787 A | 2/1993 | Skeen et al. | |
| 6,230,211 B1 | 5/2001 | Mahajan | |
| 6,453,356 B1 | 9/2002 | Sheard et al. | |
| 6,810,429 B1 * | 10/2004 | Walsh et al. | 709/246 |
| 7,158,982 B2 | 1/2007 | Bernstein et al. | |
| 7,213,208 B2 | 5/2007 | Reichel et | |
| 2002/0199182 A1 * | 12/2002 | Whitehead | 725/1 |
| 2003/0074264 A1 * | 4/2003 | Hoffman | 705/26 |
| 2004/0111698 A1 | 6/2004 | Soong et al. | |
| 2004/0225677 A1 * | 11/2004 | Rangadass | 707/102 |
| 2005/0044148 A1 | 2/2005 | Son et al. | |
| 2005/0278270 A1 * | 12/2005 | Carr et al. | 706/25 |
| 2006/0010195 A1 * | 1/2006 | Mamou et al. | 709/203 |
| 2007/0299885 A1 * | 12/2007 | Pareek et al. | 707/202 |

OTHER PUBLICATIONS

Wang, C.B.; Chen, T.Y.; Chen, Y.M.; Chu, H.C., "Design of a Meta Model for Integrating Enterprise Systems", Computers in Industry, vol. 56, Issue 3, Apr. 2005, pp. 305-322, [retrieved from http://www.sciencedirect.com/science/article/pii/S016636150400106X].*

* cited by examiner

Primary Examiner — H. S. Sough
Assistant Examiner — Brian Wathen
(74) Attorney, Agent, or Firm — Schmeiser, Olsen & Watts; John R. Pivnichny

(57) ABSTRACT

A method and system for sharing data between a calling application and a callee application. A callee application receives a request for processing data owned and stored by the calling application in a data table. The callee application receives a document to which containers that include data elements from the data table are attached in a predefined order. The callee application identifies element types corresponding to the containers based on a mapping interface table. The callee application unloads data elements from the containers into a data store via the predefined order and associates the data elements with the corresponding element types. The callee application processes the data according to the request. The processing includes applying a business rule to a data element based on the business rule being associated with an element type of the data element. Only the callee application has knowledge of the applied business rule.

18 Claims, 6 Drawing Sheets

300

PR_Id:CHAR(6) (FK) (AK1.1)
PRChrgs_Seq_Num:SMALLINT (FK) (AK1.2)
PRAccnt_Seq_Num:SMALLINT (AK.1.3)

Exp_CtryCd:CHAR(3) (FK)
Exp_Co_Cd:CHAR(4) (FK)
Exp_CoCOA_Id:CHAR(10) (FK)
CostCtr_Id:VARCHAR(40) (FK)
PRAccnt_Pct:DECIMAL(6,3)
PRAccnt_Qty:DECIMAL(15,3)
PRAcct_Net_Amt:DECIMAL(17,5)
MLoc_Net_Amt:DECIMAL(17,5)
PRAccnt_Status_Cd:CHAR(4)
PRAccnt_Cat_Id_1:VARCHAR(240)
PRAccnt_Cat_Id_2:VARCHAR(240)
PRAccnt_Cat_Id_3:VARCHAR(240)
PRAccnt_Cat_Id_4:VARCHAR(240)
PRAccnt_Cat_Id_5:VARCHAR(240)
PRAccnt_Cat_Id_6:VARCHAR(240)
PRAccnt_Cat_Id_7:VARCHAR(240)
PRAccnt_Cat_Id_8:VARCHAR(240)
PRAccnt_Cat_Id_9:VARCHAR(240)
PRAccnt_Cat_Id_10:VARCHAR(240)
PRAccnt_Cat_Id_11:VARCHAR(240)
PRAccnt_Cat_Id_12:VARCHAR(240)
PRAccnt_Cat_Id_13:VARCHAR(240)
PRAccnt_Cat_Id_14:VARCHAR(240)
PRAccnt_Cat_Id_15:VARCHAR(240)
PRAccnt_Desc:VARCHAR(254)
Row_Prog_Updt_Id:CHAR(12)
Row_Status_Cd:CHAR(1)
Row_Update_Time:TIMESTAMP
Row_LastUpd_UserId:VARCHAR(80)
Row_Create_Time:TIMESTAMP
Row_Create_UserId:VARCHAR(80)

InstAppl_Id: CHAR(12) (FK) (AK1.1)
DocType_Cd: CHAR(12) (FK) (AK1.2)
Corp_Id: CHAR(10) (FK) (AK1.3)
AcctET_Cd: CHAR(20) (FK)

IAAcctET_Level_Cd: CHAR(4) (AK1.4)
IAAcctET_Seq_Num: SMALLINT (AK1.5)
IAAcctET_Search_Cd: CHAR(4)
IAAcctET_Log_Cd: CHAR(4)
Row_Prog_Updt_Id: CHAR(12)
Row_Status_Cd: CHAR(1)
Row_Update_Time: TIMESTAMP
Row_LastUpd_UserId: VARCHAR(80)
Row_Create_Time: TIMESTAMP
Row_Create_UserId: VARCHAR(80)

*FIG. 4*

DATA SHARING BETWEEN APPLICATIONS WHERE ONLY ONE APPLICATION KNOWS THE BUSINESS PURPOSE OF THE DATA

FIELD OF THE INVENTION

The present invention relates to an application data exchange method and system, and more particularly to a technique for data sharing between applications where only one application knows the business purpose of the data.

BACKGROUND OF THE INVENTION

Conventionally, application data exchange techniques require costly and time-consuming design of customized containers for specific uses of data being shared between a calling application and a callee application. Further, the customized containers limit the known application data exchange schemes to an inflexible approach. Still further, the conventional calling application is aware of the functions of the callee application and therefore additional logic must be written to support such functions. Moreover, conventional application data exchange approaches require costly and time-consuming maintenance as changes to the functions of the callee application occur. Thus, there exists a need to overcome at least one of the preceding deficiencies and limitations of the related art.

SUMMARY OF THE INVENTION

In a first embodiment, the invention provides a first computer-implemented method of sharing data between applications. The first computer-implemented method includes a callee application receiving a request from a calling application for a processing of a first set of data owned by the calling application and stored by the calling application in a data table of a data repository. The first set of data includes a plurality of data elements. The calling application is being executed on a first computing system and the callee application is being executed on a second computing system. The data repository is coupled to the first computing system. The callee application receives a document to which a plurality of containers from the data table is attached in a predefined order or with a plurality of predefined labels. The plurality of containers includes the plurality of data elements. The callee application identifies a plurality of element types associated with the plurality of containers, where the element types are associated with the containers in a one-to-one correspondence. Determining the plurality of element types includes translating the plurality of containers into the plurality of element types via a mapping interface table. The callee application unloads the plurality of containers subsequent to determining the plurality of element types. The data elements in the containers are unloaded into a data store via the predefined order or via the plurality of predefined labels. The unloading of the plurality of containers includes associating, in the data store, the data elements with the element types. The callee application processes the first set of data according to the request. Processing the first set of data includes applying a business rule to a data element of the plurality of data elements based on the business rule being associated with an element type of the plurality of element types, where the element type is associated in the data store with the data element. A result of processing the first set of data is a second set of data that includes an update of the plurality of data elements. The callee application knows the business rule being applied, but the calling application does not know the business rule.

A system, computer program product and a process for supporting computing infrastructure that provides at least one support service corresponding to the above-summarized method are also described and claimed herein.

In a second embodiment, the invention provides a second computer-implemented method of sharing data between applications. The second computer-implemented method includes a calling application sending to a callee application a request for a processing of a first set of data owned by the calling application and stored by the calling application in a data table of a data repository. The first set of data includes a plurality of data elements. The calling application generates a document associated with a function of the calling application. The calling application loads a plurality of containers that includes a plurality of data elements into the document. The loading is performed in a predefined order or with a plurality of predefined labels. The document is sent by the calling application to the callee application. The sending of the document facilitates: (1) a translation of the plurality of containers into a plurality of element types via a mapping interface table, where the containers are associated with the element types in a one-to-one correspondence; (2) an unloading of the plurality of data elements from the plurality of containers into a data store via the predefined order or via the plurality of predefined labels, where a result of the unloading is an association in the data store of the plurality of data elements with the plurality of element types, and (3) the processing of the first set of data subsequent to the unloading, where the processing includes an application of a business rule to a data element of the plurality of data elements based on the business rule being associated with an element type of the plurality of element types. The element type is associated in the data store with the data element. A result of the processing is a second set of data that includes an update of the plurality of data elements. The calling application does not know the applied business rule and the callee application knows the applied business rule.

Advantageously, the present invention allows multiple calling applications to obtain, edit or validate a set of data via functions of a single callee application, where only the callee application is aware of the business purpose of each element of the set of data. Moreover, no additional logic is needed in the calling application to support the functions of the callee application.

BRIEF DESCRIPTION OF THE DRAWINGS

FIG. 3 is an example of a definition of a data table that stores data to be processed in the process of FIGS. 2A-2B, in accordance with embodiments of the present invention.

FIG. 4 is an example of a definition of a mapping interface table that translates between containers and element types in the process of FIGS. 2A-2B, in accordance with embodiments of the present invention.

DETAILED DESCRIPTION OF THE INVENTION

Overview

The invention disclosed herein is a technique for sharing data between a software-based calling application (i.e., sending application) and a software-based callee application (i.e., receiving application). The calling application is unaware of the content and the business purpose of each of the data elements that are being shared. The calling application owns the data being shared and persists (i.e., stores) the data in a data table. The callee application is unaware of the structure of the data table, but has knowledge of how many containers of data elements will be sent by the calling application, the order of the containers, and the business purpose of the data element in each container. The business purpose of a data element is known only by the callee application. The calling application has knowledge of the table structure associated with the containers and the order in which to send the containers to the callee application. In one embodiment, the sharing of the data utilizes a consistent positional exchange that is agreed upon by both the calling application and the callee application.

As used herein, a container is defined to be a location in which a software-based application places a piece of data (i.e., a data element). A container is, for example, an element of an array. As used herein, a business purpose of a data element is defined to be an objective of a piece of data.

Application Data Sharing System

Figure 1:
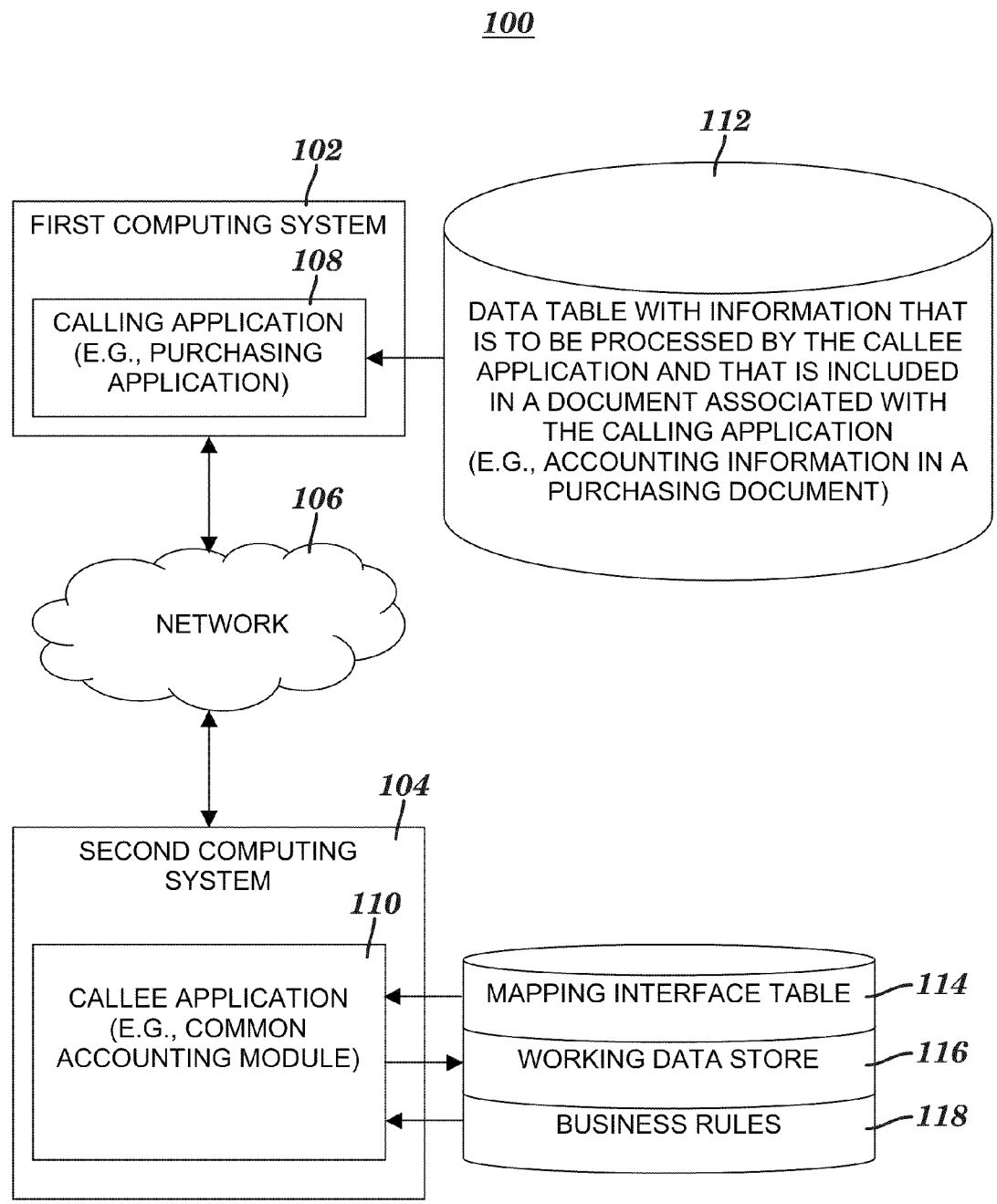
FIG. 1 is a block diagram of a system for data sharing between applications where only one application knows the business purpose of the data, in accordance with embodiments of the present invention.

FIG. 1 is a block diagram of a system for data sharing between applications where only one application knows the business purpose of the data, in accordance with embodiments of the present invention. System 100 includes a first computing system 102 and a second computing system 104 that share data via a network 106 (e.g., the Internet). First computing system 102 executes a calling application 108. Second computing system 104 executes a callee application 110. Calling application 108 requests a processing of data that requires a function of the callee application. For example, the calling application is a purchasing application that requests the creating, editing or validating of information related to an accounting function of the callee application.

A data table 112 is stored in a data repository coupled to first computing system 102 and is accessible by calling application 108. Data table 112 includes a primary document that includes a set of data elements that are to be processed by one or more functions of callee application 110. Calling application 108 creates the primary document and stores the primary document in data table 112. Callee application 110 does not have access to data table 112. Further, callee application 110 does not persist the set of data elements prior to the processing of the set of data elements.

The data elements in the set of data elements being processed are placed in containers that are attached to a generic document associated with calling application 108. Each container includes one data element. For example, a container is an element of an array or an element of another data structure. The generic document includes only a subset of information contained in the primary document that is created by the calling application 108. The subset of information includes only the data elements required by the processing to be performed by the callee application 110 (i.e., required by the aforementioned one or more functions of the callee application). For instance, the document is a result of packaging only the accounting information included in a purchasing document, where the purchasing document includes both accounting information and non-accounting information. The accounting information is required by an accounting application that will validate the accounting information or edit or create other accounting information.

As used herein, a document (e.g., a primary document and a generic document) is defined as a collection of related information produced by a computer application (e.g., calling application 108). In one embodiment, a document is a set of data stored in multiple related database tables (e.g., DB2® tables). Different primary documents are produced by different calling applications (e.g., calling application 108) and the different primary documents may have different formats (i.e., include different sets of data). For example, a first primary document may be a first set of data that includes only data elements A, B, C, D, and E (i.e., first set [A, B, C, D, E]), while a second primary document may be a second set of data that includes only data elements A, B, C, F, G and H (i.e., second set [A, B, C, F, G, H]). A generic document, however, has a common format (a.k.a. consistent format) irrespective of the calling application that produces the generic document. The common format of the generic document includes a consistent subset of data that is known by and expected by callee application 110. The consistent subset of data included in a generic document is a subset commonly included in any of multiple sets of data included in different primary documents produced by different calling applications (e.g., calling application 108). Continuing the example in this paragraph, a generic document may include the consistent subset of data consisting of data elements A and B (i.e., a subset of both the first set [A, B, C, D, E] and the second set [A, B, C, F, G, H]). In another embodiment, the data elements to be processed by the callee application 110 are retrieved from data table 112 and from one or more other data tables (not shown).

A mapping interface table 114, a working data store 116, and business rules 118 are stored in one or more data repositories coupled to second computing system 104. Mapping interface table is read by callee application 110 to translate between the containers and corresponding element types. Callee application 110 stores the containers and the corresponding element types in working data store 116. Furthermore, callee application 110 reads and applies business rules 118 to process the data as requested by the calling application 108. The access to business rules 118 allows callee application 110 to have knowledge (i.e., be aware) of the business purpose of each of the data elements included in the containers. It should be noted that business rules 118 are accessible only by callee application 110 and are not accessible by calling application 108. Therefore, the calling application has no knowledge (i.e., is unaware) of the business purpose of the data element included in the containers.

As used herein, a business rule is defined as a requirement of a business entity (i.e., a statement that defines or constrains an aspect of a business entity). A data table that includes business rules 118 includes predetermined associations between business rules and element types, where one or more business rules are associated with each element type. As used herein, an element type is defined as a classification of a data element included in a set of data. A business rule is applied to a data element if the business rule is associated with an element type of the data element. The application of a business rule to a data element facilitates attaining the business purpose of the data element. Examples of business rules include the following statements:

1. A material number must be input when the purchase is indicated to be for plant inventory.

2. For an expense purchase, the user must select a cost center, an internal order, or a WBS element as the charged entity.

3. If the purchase is to be split across multiple cost objects, the percentages charged must add up to 100.

In one embodiment, system 100 is implemented by an integrated web application environment in which documents are passed between calling application 108 and callee application 110 via a web service.

In one embodiment, a plurality of calling applications (not shown) being executed on a plurality of computing systems (not shown) send data processing requests to callee application 110 via network 106. No calling application of the plurality of calling applications has knowledge of the business purpose of any data element being shared between a calling application and the callee application 110. That is, no calling application has access to the data table that includes business rules 118.

Further details about the functionality of the components of system 100 are included in the discussion below relative to FIGS. 2A-2B.

Application Data Sharing Process

Figure 2A:
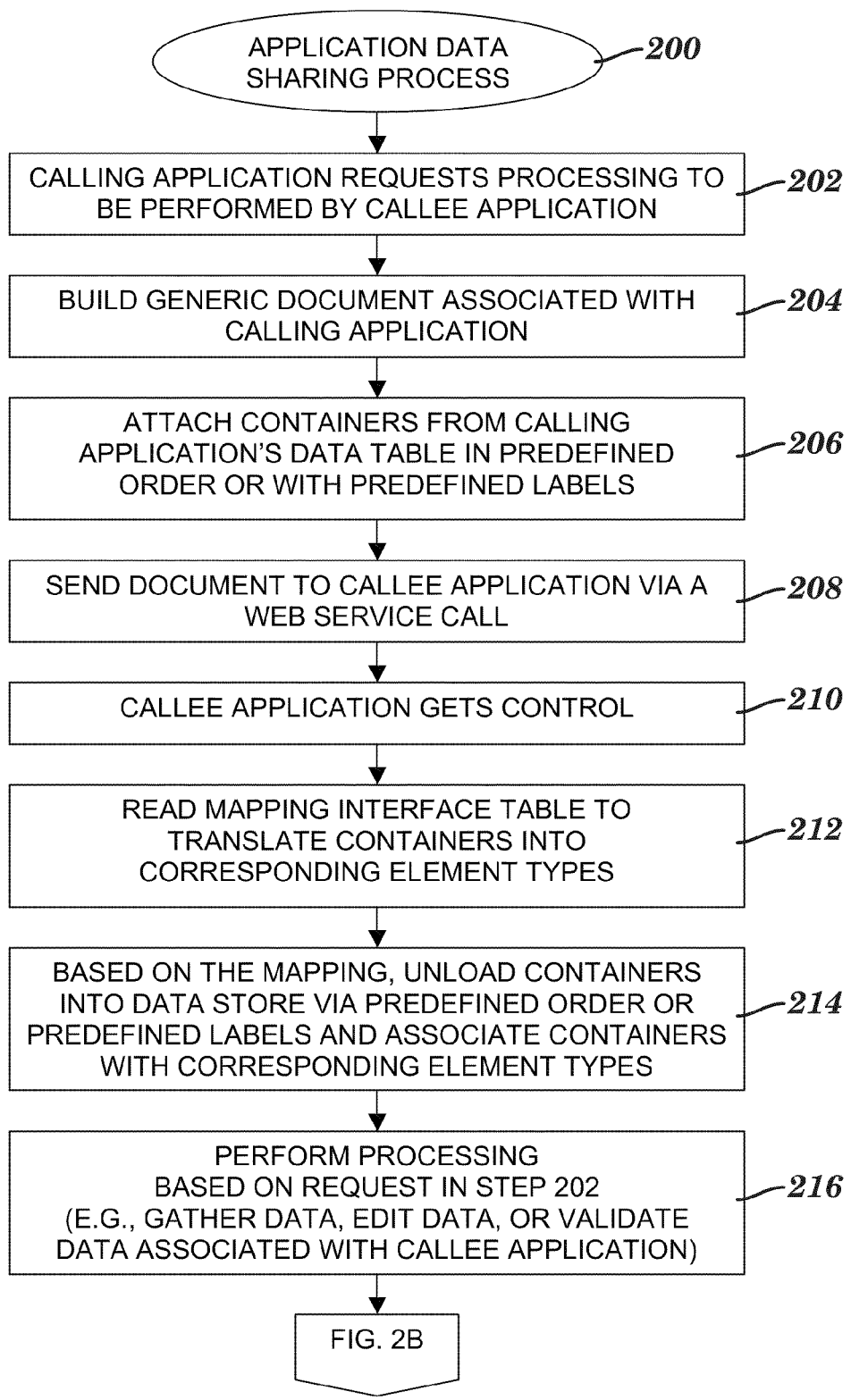
FIGS. 2A-2B is a flow diagram of an application data sharing process implemented by the system of FIG. 1, in accordance with embodiments of the present invention.
Figure 2B:
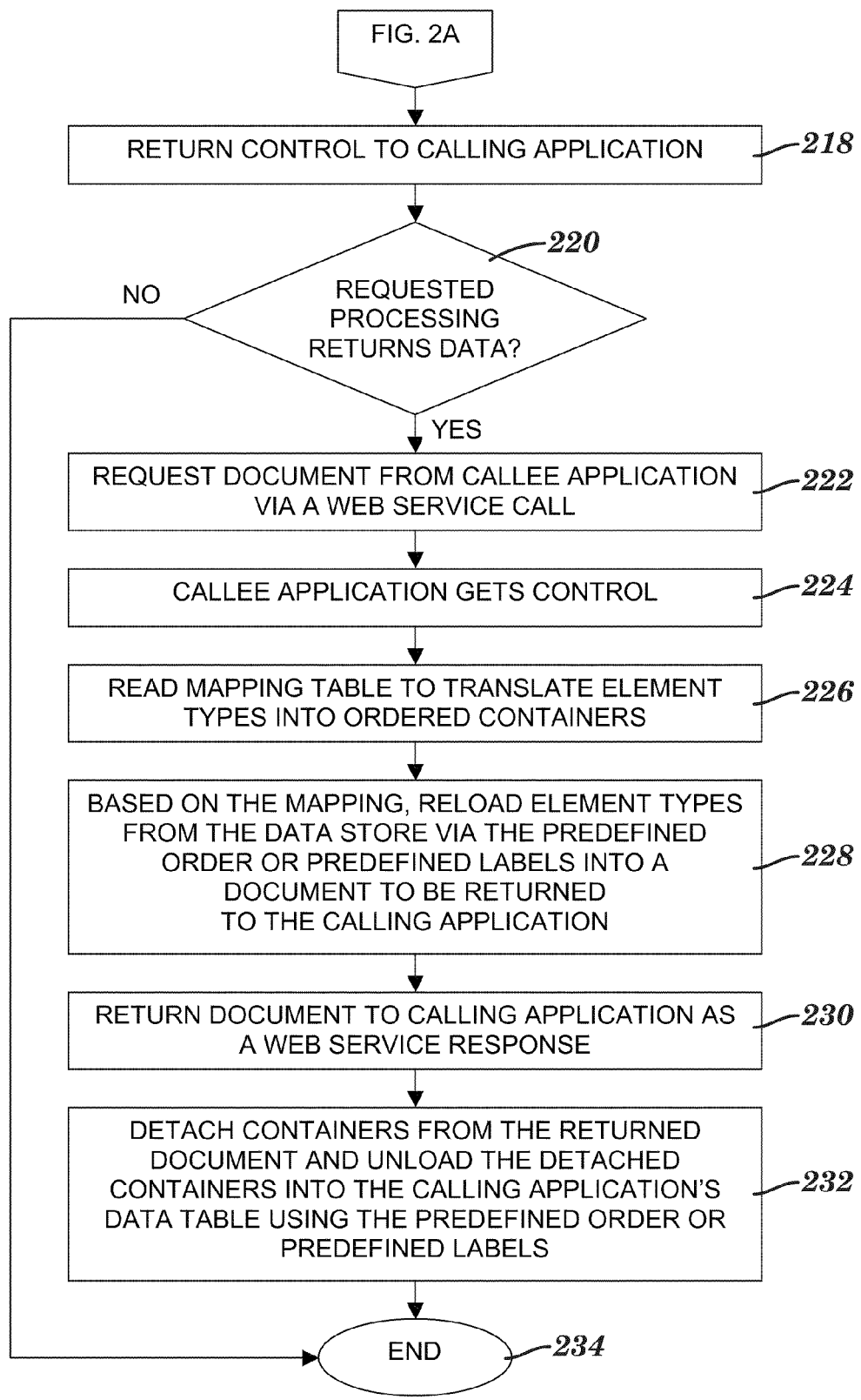

FIGS. 2A-2B is a flow diagram of an application data sharing process implemented by the system of FIG. 1, in accordance with embodiments of the present invention. The application data sharing process begins at step 200 of FIG. 2A. In step 202, calling application 108 (see FIG. 1) sends a request to callee application 110 (see FIG. 1) via network 106 (see FIG. 1). The request sent in step 202 is a request for callee application 110 (see FIG. 1) to process a first set of data that is owned by calling application 108 (see FIG. 1) and stored by the calling application in data table 112 (see FIG. 1). Following step 202, callee application 110 (see FIG. 1) receives the request sent in step 202.

The first set of data to be processed by the request sent in step 202 includes multiple data elements. The business purpose of each of the data elements is known only by callee application 110 (see FIG. 1) and is not known by any calling application that may request processing of data by the callee application. Calling application 108 (see FIG. 1) has business knowledge of the first set of data as a whole, but does not have knowledge of each of the data elements individually.

In step 204, calling application 108 (see FIG. 1) generates (i.e., builds) a generic version of a document (a.k.a. generic document) associated with a function of calling application 108 (see FIG. 1). From data table 112 (see FIG. 1), calling application 108 (see FIG. 1) retrieves the data elements of the first set of data to be processed by the request sent in step 202. The data elements retrieved may be a subset of the data included in a primary document created by calling application 108 (see FIG. 1) and stored in data table 112 (see FIG. 1). The retrieved data elements are the data elements of data table 112 (see FIG. 1) that are required by one or more functions of the callee application 110 (see FIG. 1).

Although the process described in this section retrieves data elements from and stores data elements into a single data table 112, the invention includes other embodiments in which the data elements are retrieved from and stored into multiple data tables.

For example, the retrieved data elements may be all the accounting information in a primary document stored in data table 112 (see FIG. 1), where the accounting information is needed by functions of an accounting application that is acting as the callee application. Such retrieved data elements may be unit price and quantity. Other information (e.g., catalog name and part number) in the primary document stored in data table 112 (FIG. 1) is not retrieved because it is not needed by the functions of the accounting application.

The generic document generated in step 204 has a consistent format that is used by any calling application that is sharing data with callee application 110 (see FIG. 1) via the process of FIGS. 2A-2B. For example, one procurement application may create a first primary document in the form of a shopping cart and another procurement application may create a second primary document in the form of a payment request whose content is different from the content of the first primary document. In this example, both procurement applications retrieve relevant accounting information from their respective primary documents and place the relevant accounting information in generic documents having the same format.

In step 206, calling application 108 (see FIG. 1) loads containers into the document initially generated in step 204. The containers loaded in step 206 include the data elements retrieved from data table 112 (see FIG. 1). The loading of the containers in step 206 includes attaching the containers to the document initially generated in step 204 in a predefined order or with predefined labels. Hereinafter, the document to which containers are attached in step 206 is referred to simply as "the document." In one embodiment, the containers loaded in step 206 are elements of an array. The containers may also be elements of another data structure other than an array.

In step 208, calling application 108 (see FIG. 1) sends the document to callee application 110 (see FIG. 1) via network 106 (see FIG. 1). Following step 208, callee application 110 (see FIG. 1) receives the document sent in step 208. In one embodiment, the document is sent in step 208 via a web service call.

In step 210, callee application 110 (see FIG. 1) obtains control in the application data sharing process of FIGS. 2A-2B. In step 212, callee application 110 (see FIG. 1) reads mapping interface table 114 (see FIG. 1) to translate the containers attached to the document into element types, where the translation is performed according to the position of each container in the predefined order or according to each container's label. Thus, mapping interface table 114 (see FIG. 1) is checked in step 212 to determine what element type is associated with a container based on the container's position in the predefined order. Mapping interface table 114 (see FIG. 1) associates element types with the containers in a one-to-one correspondence, so that each element type is a type of a data element included in a container. That is, in step 212, callee application 110 (see FIG. 1) identifies a one-to-one mapping between the containers and element types of the data elements included in the containers. As used herein, an element type of a data element included in a container is also simply referred to as an element type of a container or a corresponding element type of a container.

In step 214, based on the mapping identified in step 212, callee application 110 (see FIG. 1) unloads the contents of the containers into working data store 116 (see FIG. 1) via the predefined order or via the predefined labels. The unloading of the containers in step 214 also includes storing the element types of the containers in working data store 116 (see FIG. 1) by the callee application, so that data store 116 (see FIG. 1) associates the content (i.e., data element) of each container with the element type that classifies the content.

In step 216, callee application 110 (see FIG. 1) processes the first set of data according to the request sent in step 202. For each data element in working data store 116 (see FIG. 1), step 216 includes callee application 110 (see FIG. 1) (1) retrieving from business rules 118 (see FIG. 1) one or more business rules associated with the element type of the data element; (2) applying the one or more retrieved business rules to the data element; and (3) updating and/or adding data to the working data store 116 (see FIG. 1) to update or validate information as required by a function of callee application 110 (see FIG. 1). The updated and/or added data is a second set of data that is a result of the processing in step 216. The second set of data may be different from the first set of data.

The above-described retrieving of the business rule results in the callee application 110 (see FIG. 1) knowing the business rule (i.e., knowing the business purpose of data elements of the first set of data).

The processing in step 216 is performed via one or more functions of callee application 110 (see FIG. 1) and may include modifying or validating the first set of data, or may include obtaining or creating data to add to the first set of data.

Steps 202-216 are performed with callee application 110 (see FIG. 1) having no knowledge of a location in data table 112 (see FIG. 1) in which the container is stored.

The application data sharing process continues in FIG. 2B. In step 218, calling application 108 (see FIG. 1) obtains control of the application data sharing process. If calling application 108 (see FIG. 1) determines in step 220 that the processing requested in step 202 (see FIG. 2A) returns the second set of data to the calling application, then the application data sharing process continues with step 222. For example, step 222 follows step 220 in response to step 220 determining that the request sent in step 202 (see FIG. 2A) is a request to (1) obtain (i.e., gather) data that is created or edited by a function of callee application 110 (see FIG. 1), and (2) add the obtained data to the first set of data to form the second set of data.

In step 222, calling application 108 (see FIG. 1) sends a request to callee application 110 (see FIG. 1) via network 106 (see FIG. 1). The request sent in step 222 is a request for the document to be sent from callee application 110 (see FIG. 1) to the calling application 108 (see FIG. 1). In one embodiment, the request in step 222 is performed via a web service call. Following step 222, callee application 110 (see FIG. 1) receives the request sent in step 222.

In step 224, callee application 110 (see FIG. 1) obtains control in the application data sharing process. In step 226, callee application 110 (see FIG. 1) reads mapping interface table 114 (see FIG. 1) to translate element types into containers. Thus, mapping interface table 114 (see FIG. 1) is checked in step 226 to determine what container is associated with each element type in working data store 116 (see FIG. 1). Again, mapping interface table 114 (see FIG. 1) associates element types with the containers, so that each element type is a type of a data element included in a container. That is, in step 226, callee application 110 (see FIG. 1) identifies a one-to-one mapping between the element types and the containers.

In step 228, based on the mapping identified in step 226, callee application 110 (see FIG. 1) reloads data elements and element types from data store 116 (see FIG. 1) into the document whose return to calling application 108 (see FIG. 1) was requested in step 222. The reloading in step 228 is performed via the predefined order or the predefined labels. Following step 228, the document has ordered containers attached thereto, where the ordered containers include data (e.g., edited data or newly created data) that results from the processing of the first set of data in step 216 (see FIG. 2A).

In step 230, callee application 110 (see FIG. 1) sends the document reloaded in step 228 to calling application 108 (see FIG. 1) via network 106 (see FIG. 1). In one embodiment, the document is sent in step 230 as a response to a web service call. Following step 230, calling application 108 (see FIG. 1) receives the document sent in step 230.

In step 232, calling application 108 (see FIG. 1) detaches the ordered containers from the document sent in step 230 and unloads the detached containers into data table 112 (see FIG. 1) using the predefined order or the predefined labels. Following step 232, the application data sharing process ends at step 234.

Returning to step 220, if calling application 108 (see FIG. 1) determines that the processing requested in step 202 (see FIG. 2A) does not return any data to the calling application (e.g., the requested processing validates the first set of data), then the application data sharing process ends at step 234.

It should be noted that the above-described steps (i.e., step 206 and step 214 of FIG. 2A and step 228 and step 232 of FIG. 2B) that mention the predefined order or the predefined labels refer to two embodiments of the invention. For the first embodiment, steps 206 (see FIG. 2A), 214 (see FIG. 2A), 228 (see FIG. 2B) and 232 (see FIG. 2B) utilize the predefined order of the containers (e.g., the ordered elements of an array). For the second embodiment, steps 206 (see FIG. 2A), 214 (see FIG. 2A), 228 (see FIG. 2B) and 232 (see FIG. 2B) utilize the predefined labels without regard to an ordering scheme (e.g., non-ordered Extensible Markup Language (XML) labels associated with data elements being shared between the calling application and the callee application). In the second embodiment, no semantic meaning relative to the predefined labels is known by calling application 108 (see FIG. 1).

Consistent Positional Exchange

In one embodiment, a consistent positional exchange is provided by the predefined order being used in step 206 (see FIG. 2A) and in step 232 (see FIG. 2B). Using the consistent positional exchange, calling application 108 (see FIG. 1) agrees to send callee application 110 (see FIG. 1), for example, 20 pieces of data, which are always in a particular order in an array. Further, calling application 108 (see FIG. 1) knows that the array has 20 elements, the first element of the array is populated from table A, column 1 (i.e., A.1), the second element is populated from A.2, the third element is populated from A.3, the fourth element is populated from B.1, etc. Upon receiving the array, the callee application 110 (see FIG. 1) knows the first data element in the array (i.e., the data element in the first element of the array) is to be processed according to one or more business rules corresponding to the element type of the first data element in the array, the second data element in the array is to be processed according to one or more business rules corresponding to the element type of the second data element in the array, etc. When the calling application receives data back from the callee application, the calling application unloads the array into the data tables in the same order the array was populated (see step 232 of FIG. 2B). Thus, in response to unloading the array, the first element of the array is stored in A.1, the second element is stored in A.2, the third element is stored in A.3, the fourth element is stored in B.1, etc.

Example

In one embodiment, multiple procurement applications are gathering accounting data for the purpose of charging items being procured. The multiple procurement applications include calling application 108 (see FIG. 1). Callee application 110 (see FIG. 1) is an accounting application that is separate from the procurement applications. The accounting data being gathered is not persisted in the accounting application. The accounting data is owned by the procurement applications.

In the procurement application (e.g., an accounts payable utility) acting as calling application 108 (see FIG. 1), the accounting data is stored in a data table PES.TPR_Account whose definition 300 is shown in FIG. 3. Although some of the fields shown in FIG. 3 have names that convey purposes (e.g., PRAccnt_Qty, which holds a quantity), the procurement application that owns the data table does not need to know (and does not know) what those purposes are.

The accounting application, acting as the callee application, contains a mapping interface table PES.TInstAppl_AcctET whose definition 400 is shown in FIG. 4. The accounting application also may contain one or more parent tables (not shown) to the mapping interface table. A parent table to the mapping interface table may include an identification of the calling application and the number of elements that are to be passed back and forth between the calling application and the callee application. The mapping interface table PES.TInstAppl_AcctET includes accounting data elements that are cross-referenced with element types in an element type table (not shown). Further, the mapping interface table PES.TInstAppl_AcctET includes the positions of the accounting data elements in the array that is passed between the calling application and the callee application.

The procurement application needs to pass 20 accounting elements (i.e., a subset of the data elements in the data table PES.TPR_Account) to the accounting application. The procurement application builds an array of 20 elements. The procurement application then loads 20 data elements from columns of the PES.TPR_Account table into the 20-element array in order (see step 206 of FIG. 2A). The eighth element of the array includes the value in the following column of PES.TPR_Account (see FIG. 3):

PES.TPR_Account.PRAcct_Cat_Id_4

The accounting application receives 20 accounting data elements from the procurement application (see step 208 of FIG. 2A). Using the PES.TInstAppl_AcctET table (see FIG. 4), the accounting application discovers that IAAcctET_Seq_Num of 8 (i.e., eighth element of the array) has an AcctET_Cd (i.e., accounting element type code) of PROF, which means that the accounting data element in the eighth position of the array is a profit center accounting element (see step 214 of FIG. 2A). The accounting application applies all relevant business rules and validations and inputs to the accounting data element in the eighth position of the array, treating the accounting data element as a profit center (see step 216 of FIG. 2A).

When the accounting application has completed its processing, the accounting application builds an array of accounting data elements to pass back to the procurement application, based on the position of accounting data elements in PES.TInstAppl_AcctET. The value for PROF is loaded as the eighth element of the array (see step 228 of FIG. 2B). The procurement application receives the array of accounting data elements from the accounting application (see step 230 of FIG. 2B). The procurement application then unloads the array in the same order the array was loaded. The eighth element of the array is loaded back into PES.TPR_Account.PRAcct_Cat_Id_4 (see step 232 of FIG. 2B). Thus, the procurement application receives the accounting data elements without ever needing to know the content of PES.TPR_Account.PRAcct_Cat_Id_4 or any business rules associated with PES.TPR_Account.PRAcct_Cat_Id_4.

Computing System

Figure 5:
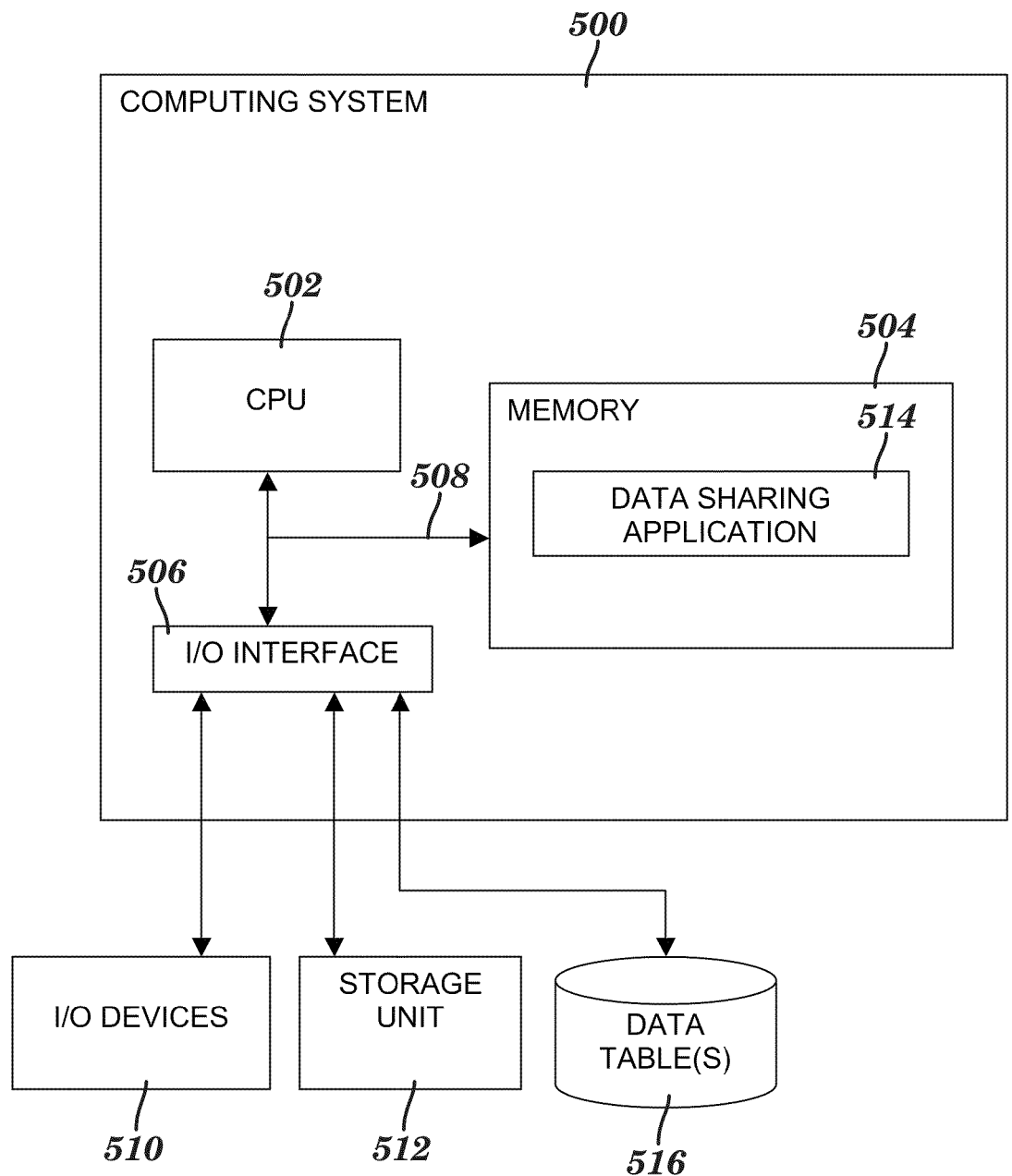
FIG. 5 is a block diagram of a computing system that is included in the system of FIG. 1 and that implements the process of FIGS. 2A-2B, in accordance with embodiments of the present invention.

FIG. 5 is a block diagram of a computing system that is included in the system of FIG. 1 and that implements the process of FIGS. 2A-2B, in accordance with embodiments of the present invention. Computing system 500 generally comprises a CPU 502, a memory 504, an input/output (I/O) interface 506, and a bus 508. Computing system 500 is coupled to I/O devices 510, storage unit 512, and a data repository that includes data tables 516. CPU 502 performs computation and control functions of computing system 500. CPU 502 may comprise a single processing unit, or be distributed across one or more processing units in one or more locations (e.g., on a client and server).

In one embodiment, computing system 500 is first computing system 102 (see FIG. 1) and data tables 516 include data table 112 (see FIG. 1). In another embodiment, computing system 500 is second computing system 104 (see FIG. 1) and data tables 516 include mapping interface table 114, working data store 116 and business rules 118.

Memory 504 may comprise any known type of data storage media, including bulk storage, magnetic media, optical media, random access memory (RAM), read-only memory (ROM), a data cache, a data object, etc. Cache memory elements of memory 504 provide temporary storage of at least some program code in order to reduce the number of times code must be retrieved from bulk storage during execution. Storage unit 512 is, for example, a magnetic disk drive or an optical disk drive that stores data. Moreover, similar to CPU 502, memory 504 may reside at a single physical location, comprising one or more types of data storage, or be distributed across a plurality of physical systems in various forms. Further, memory 504 can include data distributed across, for example, a LAN, WAN or storage area network (SAN) (not shown).

I/O interface 506 comprises any system for exchanging information to or from an external source. I/O devices 510 comprise any known type of external device, including but not limited to a display monitor, keyboard, pointing device, speakers, handheld device, printer, facsimile, etc. I/O devices can be coupled to computing system 500 directly or through I/O interface 506. Bus 508 provides a communication link between each of the components in computing system 500, and may comprise any type of transmission link, including electrical, optical, wireless, etc.

I/O interface 506 also allows computing system 500 to store and retrieve information (e.g., program instructions or data) from an auxiliary storage device (e.g., storage unit 512). The auxiliary storage device may be a non-volatile storage device (e.g., a CD-ROM drive which receives a CD-ROM disk). Computing system 500 can store and retrieve information from other auxiliary storage devices (not shown), which can include a direct access storage device (DASD) (e.g., hard disk), a magneto-optical disk drive, a tape drive, or a wireless communication device.

Memory 504 includes a data sharing application 514 (i.e., program code) for sharing data between data sharing application 514 and another application (not shown) being executed by another computing system (not shown). Memory 504 may also include other systems not shown in FIG. 5, such as an operating system (e.g., an operating system sold under the trademark LINUX®).

In one embodiment, data sharing application 514 is calling application 108 (see FIG. 1). In another embodiment, data sharing application 514 is callee application 110 (see FIG. 1).

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code 514 for use by or in connection with a computing system 500 or any instruction execution system to provide and facilitate the capabilities of the present invention. For the purposes of this description, a computer-usable or computer-readable medium can be any apparatus that can store the program for use by or in connection with the instruction execution system, apparatus, or device.

The medium can be an electronic-based, magnetic-based, optical-based, electromagnetic-based, infrared-based, or semiconductor-based system (or apparatus or device). Examples of a computer-readable medium include a semiconductor or solid state memory, magnetic tape, a removable computer diskette, RAM, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of application data sharing where only one application knows the business purpose of the data. Thus, the present invention discloses a process for supporting computer infrastructure, comprising integrating, hosting, maintaining and deploying computer-readable code into a computing system (e.g., computing system 500), wherein the code in combination with the computing system is capable of performing a method of application data sharing where only one application knows the business purpose of the data.

In another embodiment, the invention provides a business method that performs the process steps of the invention on a subscription, advertising and/or fee basis. That is, a service provider, such as a Solution Integrator, can offer to create, maintain, support, etc. a method of application data sharing where only one application knows the business purpose of the data. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of sharing data between applications, comprising:

receiving, from a calling application being executed on a first computing system and by a callee application being executed on a second computing system, a request for a processing of a first set of data owned by said calling application and stored by said calling application in a data table of a data repository coupled to said first computing system, wherein said first set of data includes a plurality of data elements;

receiving, by said callee application, a document to which a plurality of containers that includes said plurality of data elements is attached in a predefined order or with a plurality of predefined labels;

identifying, by said callee application, a plurality of element types that is associated with said plurality of containers, wherein said identifying includes translating said plurality of containers into said plurality of element types via a mapping interface table, and wherein said element types are associated with said containers in a one-to-one correspondence;

unloading, by said callee application and subsequent to said identifying, said plurality of data elements from said plurality of containers into a data store via said predefined order or via said plurality of predefined labels, wherein said unloading includes associating, in said data store, said plurality of data elements with said plurality of element types; and processing, by said callee application and subsequent to said unloading, said first set of data according to said request, wherein said processing said first set of data includes applying a business rule to a data element of said plurality of data elements based on said business rule being associated with an element type of said plurality of element types, wherein said element type is associated in said data store with said data element, wherein a result of said processing said first set of data is a second set of data that includes an update of said plurality of data elements, wherein said calling application does not know said business rule, and wherein said callee application knows said business rule.

2. The method of claim 1, further comprising:

receiving, from said calling application and by said callee application, a request for said document that includes said second set of data, wherein said receiving said request for said document is subsequent to said processing said first set of data and subsequent to a determination that said request for said processing said first set of data requires a return of said second set of data to said calling application;

translating, by said callee application, said plurality of element types into said plurality of containers via said mapping interface table;

loading, by said callee application, subsequent to said translating said plurality of element types, and via said predefined order or via said plurality of predefined labels, said second set of data from said data store into said plurality of containers, wherein said plurality of containers is attached to said document; and sending, by said callee application, said document to said calling application to facilitate an unloading of said second set of data from said plurality of containers attached to said document into said data table via said predefined order or via said plurality of predefined labels.

3. The method of claim 2, wherein said sending said document includes sending said document as a response to a web service call.

4. The method of claim 1, wherein said processing said first set of data further includes:

retrieving, from a business rules data table that associates a plurality of business rules with said plurality of element types, one or more business rules of said plurality of business rules, wherein said one or more business rules are associated with said element type via said business rules data table, and wherein said one or more business rules includes said business rule;

applying said one or more business rules to said data element; and generating said update of said plurality of data elements in response to said applying said one or more business rules, wherein said update of said plurality of data elements includes a modification of at least one data element of said plurality of data elements or a new data element added to said plurality of data elements.

5. The method of claim 4, wherein said business rules data table is stored in a data repository coupled to said second computing system, and wherein said callee application knows said business rule as a result of said retrieving.

6. The method of claim 4, further comprising receiving, by said callee application, a plurality of data processing requests from a plurality of calling applications being executed on a plurality of computing systems, wherein said receiving said plurality of requests includes said receiving said request, wherein said plurality of calling applications includes said calling application, wherein said plurality of data processing requests includes said request, and wherein no calling application of said plurality of calling applications has access to said business rules data table.

7. The method of claim 1, wherein said receiving said request, said receiving said document, said identifying said plurality of element types, said unloading said plurality of data elements from said plurality of containers, and said processing said first set of data are performed without said callee application having a knowledge of a location in said data table in which any data element of said plurality of data elements is stored.

8. The method of claim 1, wherein said receiving said document includes receiving said document via a web service call.

9. The method of claim 1, wherein said plurality of containers is a plurality of elements of an array.

10. The method of claim 1, wherein said calling application is an application that manages a plurality of purchasing functions of a business, wherein said callee application is an application that manages a plurality of accounting functions of a business, wherein said processing said first set of data includes performing an accounting function of said callee application, and wherein said accounting function is selected from the group consisting of a validation of said first set of data, a creation of accounting data to add to said first set of data, and a modification of said first set of data.

11. A computer program product, comprising:

a computer-readable, tangible storage device having a computer-readable program code stored therein, said computer-readable program code containing instructions that when executed by a processor of a second computing system implement a method of sharing data between applications, said method comprising:

receiving, from a calling application being executed on a first computing system and by a callee application being executed on said second computing system, a request for a processing of a first set of data owned by said calling application and stored by said calling application in a data table of a data repository coupled to said first computing system, wherein said first set of data includes a plurality of data elements;

receiving, by said callee application, a document to which a plurality of containers that includes said plurality of data elements is attached in a predefined order or with a plurality of predefined labels;

identifying, by said callee application, a plurality of element types that is associated with said plurality of containers, wherein said identifying includes translating said plurality of containers into said plurality of element types via a mapping interface table, and wherein said element types are associated with said containers in a one-to-one correspondence;

unloading, by said callee application and subsequent to said identifying, said plurality of data elements from said plurality of containers into a data store via said predefined order or via said plurality of predefined labels, wherein said unloading includes associating, in said data store, said plurality of data elements with said plurality of element types; and processing, by said callee application and subsequent to said unloading, said first set of data according to said request, wherein said processing said first set of data includes applying a business rule to a data element of said plurality of data elements based on said business rule being associated with an element type of said plurality of element types, wherein said element type is associated in said data store with said data element, wherein a result of said processing said first set of data is a second set of data that includes an update of said plurality of data elements, wherein said calling application does not know said business rule, and wherein said callee application knows said business rule.

12. The program product of claim 11, wherein said method further comprises:

receiving, from said calling application and by said callee application, a request for said document that includes said second set of data, wherein said receiving said request for said document is subsequent to said processing said first set of data and subsequent to a determination that said request for said processing said first set of data requires a return of said second set of data to said calling application;

translating, by said callee application, said plurality of element types into said plurality of containers via said mapping interface table;

loading, by said callee application, subsequent to said translating said plurality of element types, and via said predefined order or via said plurality of predefined labels, said second set of data from said data store into said plurality of containers, wherein said plurality of containers is attached to said document; and sending, by said callee application, said document to said calling application to facilitate an unloading of said second set of data from said plurality of containers attached to said document into said data table via said predefined order or via said plurality of predefined labels.

13. The program product of claim 12, wherein said sending said document includes sending said document as a response to a web service call.

14. The program product of claim 11, wherein said processing said first set of data further includes:

retrieving, from a business rules data table that associates a plurality of business rules with said plurality of element types, one or more business rules of said plurality of business rules, wherein said one or more business rules are associated with said element type via said business rules data table, and wherein said one or more business rules includes said business rule;

applying said one or more business rules to said data element; and generating said update of said plurality of data elements in response to said applying said one or more business rules, wherein said update of said plurality of data elements includes a modification of at least one data element of said plurality of data elements or a new data element added to said plurality of data elements.

15. The program product of claim 11, wherein said receiving said request, said receiving said document, said identifying said plurality of element types, said unloading said plurality of data elements from said plurality of containers, and said processing said first set of data are performed without said callee application having a knowledge of a location in said data table in which any data element of said plurality of data elements is stored.

16. A process for supporting computing infrastructure, said process comprising a step of:
a processor of a first computing system providing at least one support service for at least one of creating, integrating, hosting, maintaining, and deploying computer-readable code in a second computing system, the computer-readable code containing instructions, wherein the instructions, when carried out by a processor of the second computing system, implement a method of sharing data between applications, said method comprising:
receiving, from a calling application being executed on a third computing system and by a callee application being executed on said second computing system, a request for a processing of a first set of data owned by said calling application and stored by said calling application in a data table of a data repository coupled to said third computing system, wherein said first set of data includes a plurality of data elements;
receiving, by said callee application, a document to which a plurality of containers that includes said plurality of data elements is attached in a predefined order or with a plurality of predefined labels;
identifying, by said callee application, a plurality of element types that is associated with said plurality of containers, wherein said identifying includes translating said plurality of containers into said plurality of element types via a mapping interface table, and wherein said element types are associated with said containers in a one-to-one correspondence;
unloading, by said callee application and subsequent to said identifying, said plurality of data elements from said plurality of containers into a data store via said predefined order or via said plurality of predefined labels, wherein said unloading includes associating, in said data store, said plurality of data elements with said plurality of element types; and
processing, by said callee application and subsequent to said unloading, said first set of data according to said request, wherein said processing said first set of data includes applying a business rule to a data element of said plurality of data elements based on said business rule being associated with an element type of said plurality of element types, wherein said element type is associated in said data store with said data element, wherein a result of said processing said first set of data is a second set of data that includes an update of said plurality of data elements, wherein said calling application does not know said business rule, and wherein said callee application knows said business rule.

17. A computer-based method of sharing data between applications, comprising:
sending, from a calling application being executed on a first computing system and to a callee application being executed on a second computing system, a request for a processing of a first set of data owned by said calling application and stored by said calling application in a data table of a data repository coupled to said first computing system, wherein said first set of data includes a plurality of data elements;
generating, by said calling application, a document associated with a function of said calling application;
loading, by said calling application and subsequent to said generating said document, a plurality of containers that includes a plurality of data elements into said document, wherein said loading is performed in a predefined order or with a plurality of predefined labels; and
sending said document by said calling application, to said callee application, and subsequent to said loading said plurality of containers,
wherein said sending said document facilitates:
a translation of said plurality of containers into a plurality of element types via a mapping interface table, wherein said containers are associated with said element types in a one-to-one correspondence,
an unloading of said plurality of data elements from said plurality of containers into a data store via said predefined order or via said plurality of predefined labels, wherein a result of said unloading of said plurality of data elements is an association in said data store of said plurality of data elements with said plurality of element types, and
said processing of said first set of data subsequent to said unloading, wherein said processing includes an application of a business rule to a data element of said plurality of data elements based on said business rule being associated with an element type of said plurality of element types, wherein said element type is associated in said data store with said data element, wherein a result of said processing is a second set of data that includes an update of said plurality of data elements, wherein said calling application does not know said business rule and wherein said callee application knows said business rule.

18. The method of claim 17, further comprising:
determining, by said calling application and subsequent to said processing of said first set of data, that said request for said processing of said first set of data requires a return of said second set of data to said calling application;
sending, by said calling application and to said callee application, a request for said document that includes said second set of data, wherein said sending said request for said document is subsequent to said determining that said request requires said return of said second set of data;
receiving, by said calling application and from said callee application, said document subsequent to a loading of said second set of data from said data store into said document, via said predefined order or via said plurality of predefined labels, and based on a translation of said plurality of element types into said plurality of containers via said mapping interface table; and unloading, by said calling application, said second set of data from said plurality of containers attached to said document into said data table via said predefined order or via said plurality of predefined labels.

* * * * *